US009842309B1

(12) United States Patent
Gupta et al.

(10) Patent No.: US 9,842,309 B1
(45) Date of Patent: Dec. 12, 2017

(54) DEFECTIVE STORAGE UNIT MAP

(71) Applicant: Amazon Technologies, Inc., Reno, NV (US)

(72) Inventors: Shuchi Gupta, New Delhi (IN); Piyush Maheshwari, Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 586 days.

(21) Appl. No.: 14/037,108

(22) Filed: Sep. 25, 2013

(51) Int. Cl.
*G06Q 10/08* (2012.01)

(52) U.S. Cl.
CPC .................... *G06Q 10/087* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,115,643 | A  * | 9/2000 | Stine et al. | 700/110 |
| 7,084,968 | B2 * | 8/2006 | Shibuya | G01N 21/956 |
| | | | | 356/237.2 |
| 2004/0203179 | A1* | 10/2004 | Hata | 438/17 |
| 2005/0251408 | A1* | 11/2005 | Swaminathan | G06Q 30/02 |
| | | | | 705/346 |
| 2008/0243646 | A1* | 10/2008 | Stein et al. | 705/28 |
| 2010/0175965 | A1* | 7/2010 | Fukuda | G05B 19/41815 |
| | | | | 198/339.1 |

* cited by examiner

*Primary Examiner* — Luna Champagne
(74) *Attorney, Agent, or Firm* — Thomas | Horstemeyer, LLP

(57) ABSTRACT

Disclosed are various embodiments for a storage unit defect analyzer that analyzes fulfillment center storage units that are designated as defective. A subset of defective storage units is identified by accessing defect data. Location data is then accessed, where the location data indicates a plurality of physical locations associated with the subset of defective storage units. A defect density map is generated according to the plurality of physical locations, the defect density map expressing a concentration of the subset of defective storage units within a fulfillment center. The defect density map is encoded for display in a user interface.

23 Claims, 9 Drawing Sheets

| Unit Number | Location | Items | Weight | Defect? | Employee IDs |
|---|---|---|---|---|---|
| Bin 30309 | Row 3, Shelf 78 | Alligator Cufflinks, sku #432; | 1.2 lbs | ok | Bob, Mason |
| Bin 30064 | Row 3, Shelf 82 | Beach Towel, sku #121; Emo hair wig, sku #892, | 2.2 lbs | Defective | Arvind |
| Bin 95616 | Row 5, Shelf 15 | (empty) | 0.0 lbs | ok | Lenny |
| Bin 30339 | Row 3, Shelf 98 | Vacuum Cleaner, sku #107; Trojan Horse Toy, sku #771 | 25.3 lbs | ok | Mandy |

DEFECTIVE STORAGE UNIT MAP

BACKGROUND

Sellers selling items over an electronic marketplace may use a fulfillment network to store, manage, and/or track their items for sale. Accordingly, sellers may send shipments of their items to fulfillment centers to store the items as inventory. Fulfillment centers may be equipped to handle thousands of sellers sending a multitude of items. Thus, the fulfillment center may function as a warehouse that stores multiple items as inventory for a variety of sellers. As items are shipped in and out of the fulfillment center, items are placed in various storage units that temporarily store the items.

A fulfillment center may contain thousands to millions of storage units. With a large volume of items being shipped in and out of a fulfillment center, the risk of placing an item in an incorrect storage unit or losing track of an item may be relatively high. For example, the incorrect placement of an item or loss of an item may result from human error or operational error. The occurrence of placing an item in an incorrect storage unit may lead to inefficiencies associated with fulfillment center operations.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. Moreover, in the drawings, like reference numerals designate corresponding parts throughout the several views.

DETAILED DESCRIPTION

Figure 1:
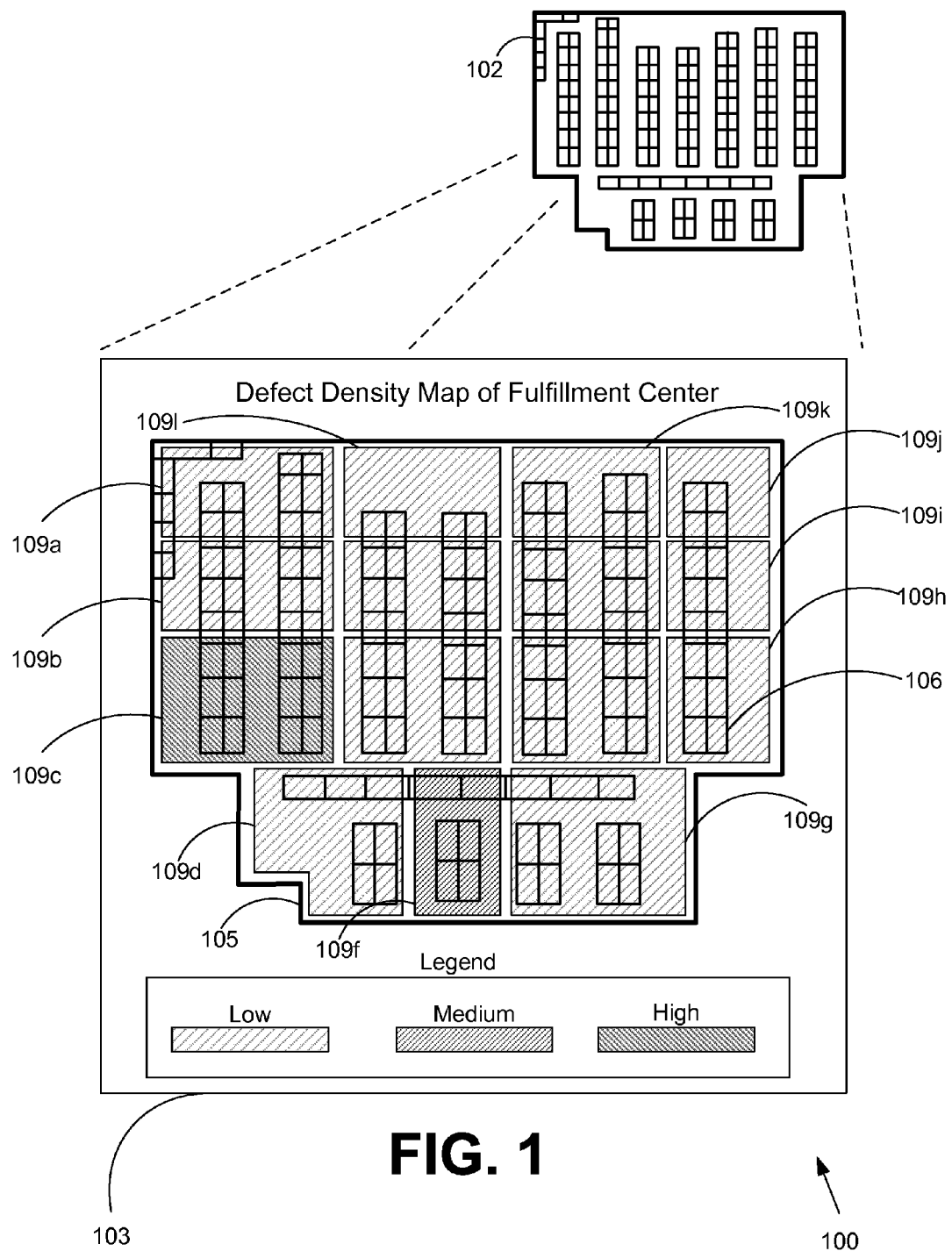
FIG. 1 is a drawing of an example of a user interface rendered by a client in a networked environment, according to various embodiments of the present disclosure.

Various embodiments of the present disclosure relate to generating a defect density map that represents areas of a fulfillment center that experience a relatively high rate of storage unit defects. A storage unit may be referred to as "defective" if there is a mismatch between the actual contents of the storage unit and the expected contents of the storage unit. This may result from erroneously storing an item in a storage unit or failing to store an item that is scheduled to be stored in the storage unit. In addition, a defect may occur if the contents of the storage unit are incorrectly counted. Further, improper activity, such as theft, or inadvertent activity, such as human error, may result in a mismatch between the actual contents of a storage unit and the expected contents of the storage unit. The present disclosure relates to analyzing defective storage units to assist with fulfillment center operations. In some embodiments, defect data is collected at the fulfillment center, where the defect data specifies those storage units that have been designated as defective. The location of the defective storage units may be determined and according to the location of the defective storage units, a defect density map that expresses a concentration of the defective storage units is generated.

To generate the defect density map, a defect analyzer may identify the locations associated with the defective storage units. The locations may be formatted according to a row, column, shelf, aisle, or other area for a particular defective storage unit. The defect analyzer may then determine a sector of the fulfillment center in which the defective storage unit belongs. A sector may have boundaries that are defined in terms of a range of rows, columns, shelves, aisles, or any other area. The boundaries of the sector may be predefined by static values and/or predefined by a user input. The defect analyzer uses the location of an identified defective storage unit to determine a corresponding sector according to the boundaries of that sector. For example, a defective storage unit located in isle 3 may be assigned to a sector that ranges from isles 2-9.

Based at least in part upon the number of defective storage units in a particular sector, the defect analyzer may determine a defect concentration for that sector. For example, the defect analyzer may determine the defect concentration according to the number of defective storage units in a sector and the total number of storage units in that sector. The defect concentration for a particular sector may be quantified in terms of an overall number of defective storage units, the percentage of storage units that are defective, the number of storage units that are not defective, the percentage of storage units that are not defective, or in any other manner.

In response to determining a defect concentration for each sector, the defect analyzer generates a defect density map based on the defect concentration for each sector as well as the location of the sectors in fulfillment center. In various embodiments, the defect density map may be formatted as a heat map where densely colored areas of the heat map represent one or more defective areas in a fulfillment center.

The defect density map may assist fulfillment center managers in identifying problematic areas of a fulfillment center. Moreover, fulfillment center managers may take action to reduce future cases of misplacing items in storage units in those areas that are associated with a high concentration of storage unit defects. For example, additional fulfillment center resources may be allocated to problematic areas identified in a defect density map. This may include performing additional counts or checks of storage units located in problematic areas. In the following discussion, a general description of the system and its components is provided, followed by a discussion of the operation of the same.

Moreover, according to some embodiments, the defect data may be used to identify individuals associated with areas of high defect concentration. For example, data relating to the individuals who are responsible for counting or tracking storage units may be maintained. This data may be used for associating one or more individuals to the cause of a storage unit defect. Additionally, items associated with defective storage units may be tracked to identify items that are at risk for causing storage unit defects. For example, an item may be prone to leading to storage unit defects because of the item's physical properties. Physical properties such as, for example, storage unit location or lighting of the storage unit may cause a particular storage unit to be more prone to storage unit defects. Therefore, there may be a causal connection between the visibility and/or location of the storage unit and the probability that a defect will occur with respect to the storage unit.

With reference to FIG. 1, shown is a drawing of an example of a networked environment 100, according to various embodiments of the present disclosure. The networked environment 100 may include a fulfillment center 102. The fulfillment center 102 may be a physical warehouse equipped to temporarily store many items as items are shipped in and shipped out of the fulfillment center. Individuals such as sellers who wish to sell items over an electronic marketplace may have their items stored in one or more fulfillment centers 102. Thus, the fulfillment center 102 may store many items for many sellers as inventory. Individuals such as buyers may place orders for items sold by sellers over the electronic commerce system. To fulfill these orders, the one or more items specified in an order are located in the fulfillment center 102 and shipped to the buyer. Thus, items that are received by sellers are to be systematically stored in storage units such that the items may be readily located and shipped to buyers.

The networked environment 100 may facilitate a rendering of a user interface 103 by a client device. The user interface 103 may present a defect density map 105 that indicates a concentration of storage unit defects in the fulfillment center 102. The defect density map 105 may represent a physical layout of the fulfillment center 102. For example, the defect density map 105 may be based on a blueprint or schematic of the structure and/or layout of the fulfillment center 102.

The fulfillment center 102 may include many storage units 106. Storage units 106 may be arranged in the fulfillment center 102 according to rows, columns, shelves, aisles, or any combination thereof. In this respect, the particular storage unit 106 may be physically located and organized in the fulfillment center. A storage unit 106 may be equipped to hold one or more items in the fulfillment center 102. For example, the storage unit 106 may include a bin, slot, shelf, container, receptacle, crate, stall, crib, or any other storage device.

The defect density map 105 may be divided into multiple sectors 109a-l. A sector 109 may be an area, a zone, a section, or partition of the fulfillment center 102. A sector 109 may be defined in terms of a range of rows, a range of columns, a range of shelves, a range of aisles, any pre-designated area, or any combination thereof. According to various embodiments, the defect density map 105 indicates a concentration of storage unit defects for each sector 109. For example, a first sector 109a and a second sector 109b may have relatively low concentrations of storage unit defects while a third sector 109c may have a relatively high concentration of storage unit defects. Another sector 109f may have a medium concentration of storage unit defects.

By generating a defect density map 105, a fulfillment center manager may identify problematic areas such as, for example, the third sector 109c. Accordingly, the fulfillment center manager may schedule for additional storage unit counting to take place in the third sector 109c. The defect density map 105 is generated based on defect data. Defect data may specify which storage units 106 among the various storage units 106 of the fulfillment center 102 are designated as defective. As an example, the defect data may be collected as storage unit counting operations are performed to verify the contents of the various storage units 106. Storage unit counting may include manually checking the contents of a storage unit 106 and comparing those contents to the expected contents for that storage unit 106. Storage unit counting may also include weighing the storage units 106 to determine if there is a discrepancy between an expected weight and an actual weight of the storage unit 106.

The defect density map 105 may be used to identify high risk areas that are prone to storage unit defects. In addition, a fulfillment center manager may investigate individuals working in identified problematic areas to address potential causes of the defects.

Figure 2:
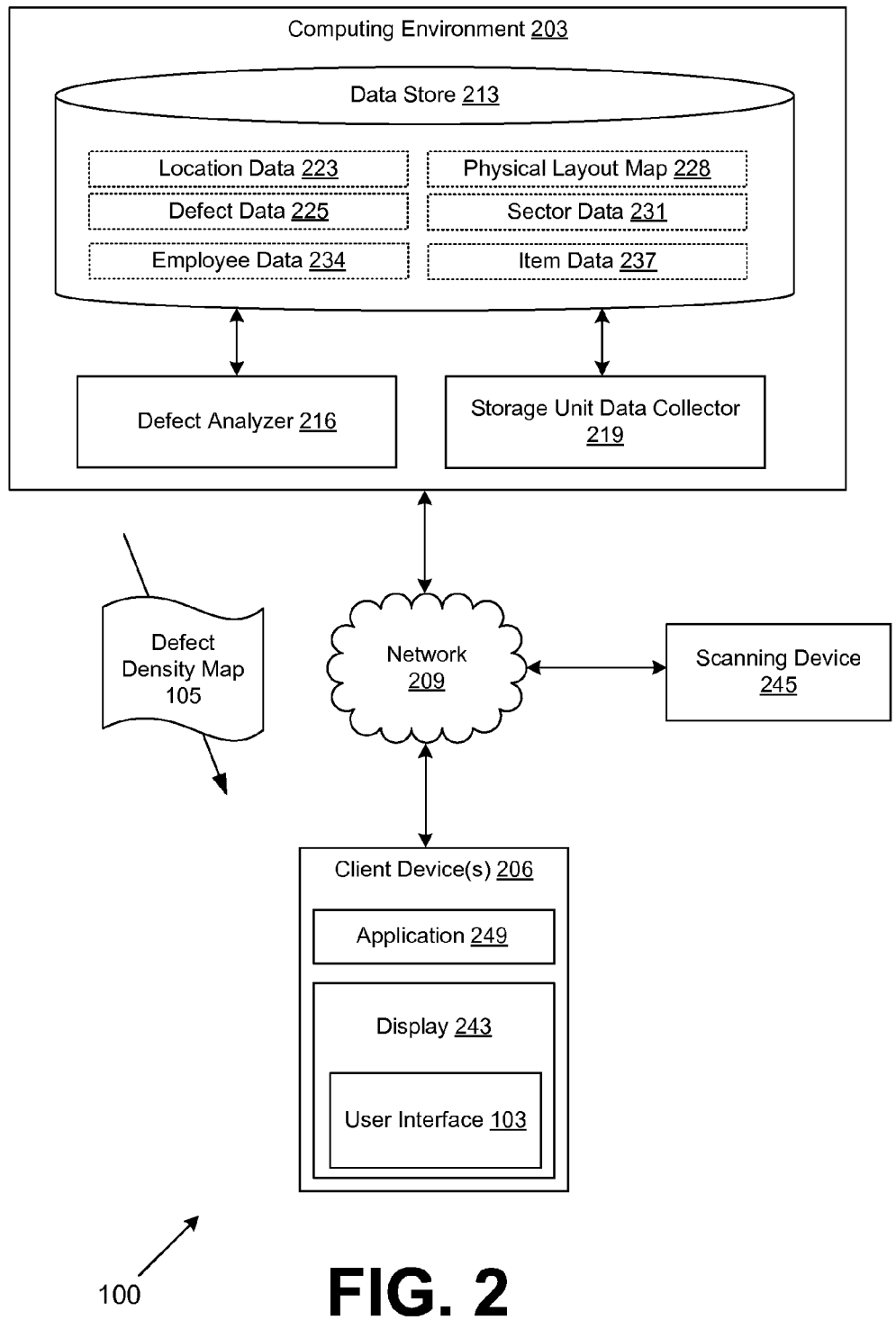
FIG. 2 is a drawing of the networked environment of FIG. 1, according to various embodiments of the present disclosure.

With reference to FIG. 2, shown is a networked environment 100 of FIG. 1, according to various embodiments. The networked environment 100 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together comprise a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 213 that is accessible to the computing environment 203. The data store 213 may be representative of a plurality of data stores 213 as can be appreciated. The data stored in the data store 213, for example, is associated with the operation of the various applications and/or functional entities described below.

The components executed on the computing environment 203, for example, include a defect analyzer 216, a storage unit data collector 219, and other applications, services, processes, systems, engines, or functionality not discussed in detail herein. The storage unit data collector 219 is executed to collect storage unit data associated with the content and/or status of the various storage units 106 (FIG. 1) of the fulfillment center 102 (FIG. 1). The storage unit data collector 219 may collect storage unit data as part of a storage unit data collection process. The storage unit data collection process relates to tracking/monitoring the status of each storage unit or a sampling of a collection of storage units. In some embodiments, the storage unit data collector 219 receives manual entries from one or more individuals working at the fulfillment center 102. In other embodiments, the storage unit data collector 219 automatically collects data from one or more storage units 106. As an example, a particular storage unit 106 may be measured by using a scale to detect the actual weight of the storage unit 106. In other embodiments, the storage unit data collector 219 automatically collects storage unit data from one or more storage units 106 using radio-frequency Identification (RFID) interrogation. Storage unit data for a particular storage unit 106 may include, for example, a storage unit number identifier, a physical location of the particular storage unit 106, a list of items stored in the particular storage unit 106, the weight of the contents of the particular storage unit 106, a status indicating whether the particular storage unit 106 is defective, or any other information relating to the particular storage unit 106. The defect analyzer 216 is operable to analyze the storage unit data and generate a defect density map 105 for a user. The defect analyzer 216 may encode the defect density map 105 for display in a user interface 103 (FIG. 1).

The data stored in the data store 213 includes, for example, location data 223, defect data 225, a physical layout map 228, sector data 231, employee data 234, item data 237, and potentially other data. The location data 223 may specify a location of a particular storage unit 106 in the fulfillment center 102. For example, the location data 223 may map an identifier of a storage unit 106 to the storage unit's physical location by referencing a row number, column number, shelf number, aisle number, or any combination thereof. The defect data 225 may specify which subset of storage units 106 among the various storage units 106 of the fulfillment center 102 are designated as defective. As one example among others, the defect data 225 may include a list of storage unit identifiers that have been designated as defective. The physical layout map 228 may include a schematic or blueprint of the fulfillment center 102. The sector data 231 may include information relating to how the fulfillment center 102 is partitioned into multiple sectors 109 (FIG. 1). The sector data 231 may be based on sector orientation parameters supplied by a user as a user input. These sector orientation parameters may control how various sectors are defined, the sizes of the sectors, the boundaries of the sectors, the number of sectors, and/or any other information relating to the orientation of the sectors.

The employee data 234 relates to individuals who are responsible for placing items in storage units 106, picking items from storage units 106, and counting and/or tracking items stored in storage units 106. The employee data 234 may indicate which individuals are responsible for the placement, picking, counting, or tracking of each storage unit 106. For example, when an individual places, picks, counts, or tracks items in a storage unit 106, that interaction may be stored as employee data 234. If an individual scans an item in a storage unit 106 as part of a storage unit counting process, a record may be generated and stored, where the record indicates that the individual has taken such an action.

The client device 206 is representative of a plurality of client devices that may be coupled to the network 209 that the client device 206 may comprise, for example, a processor-based system such as a computer system. Such a computer system may be embodied in the form of a desktop computer, a laptop computer, personal digital assistants, cellular telephones, smartphones, web pads, tablet computer systems, or other devices with like capability. The client device 206 may include a display 243. The display 243 may comprise, for example, one or more devices such as liquid crystal display (LCD) displays, gas plasma-based flat panel displays, organic light emitting diode (OLED) displays, LCD projectors, or other types of display devices, etc. Some client devices 206 may utilize a scanning device 245 that is operable to scan barcodes or otherwise scan or detect information associated with a storage unit 106 and/or an item stored in the storage unit. The scanning device 145 may be detachable, connectable, or integrated into the client device 206. The scanning device 245 may communicate with the storage unit data collector 219 via the network 209.

The client device 206 may be configured to execute various applications such as a client application 249 and/or other applications. The client application 249 may be executed in a client device 206, for example, to access network content served up by the computing environment 203 and/or other servers, thereby rendering a user interface 103 on the display 243. To this end, the client application 249 may comprise, for example, a browser, a dedicated application, etc., and the user interface 103 may comprise a network page, an application window, etc. The client device 206 may be configured to execute applications beyond the client application 249 such as, for example, email applications, social networking applications, word processors, spreadsheets, and/or other applications.

Next, a general description of the operation of the various components of the networked environment 100 is provided. To begin, the storage unit data collector 219 collects information about one or more storage units 106 in the fulfillment center 102 as part of a storage unit data collection process. The storage unit data collection process relates to tracking/monitoring the status of each storage unit.

In some embodiments, the storage unit data collector 219 receives manual entries from one or more individuals working at the fulfillment center 102. In this respect, a particular individual manually inspects a storage unit 106 and submits storage unit data using a client device 206. The individual may count the number of items or identify those items in a particular storage unit 106 and submit this information via the storage unit data collector 219. In this respect, the storage unit data collector 219 generates an interface for allowing an individual to submit storage unit data. An individual may scan a barcode for each item in the storage unit 106 and/or scan a barcode of the storage unit 106 to facilitate a collection of storage unit data using a client device 206 and/or scanning device 245. For example, a user may scan a barcode of a storage unit 106 and then scan the items stored in the storage unit 106 to capture the contents stored for the storage unit 106. The storage unit data collector 219 receives storage unit data in response to the scanning of the storage unit 106 and/or items. Thus, the storage unit data collector 219 tracks an organization of items with respect to the storage units. The storage unit data collector 219 may track the activity in a fulfillment center 102 to generate a virtual representation of the contents of the fulfillment center.

In other embodiments, the storage unit data collector 219 automatically collects data from one or more storage units 106. As an example, a particular storage unit 106 may be measured by using a scale to detect the actual weight of the storage unit 106. In addition, an expected weight for each storage unit may be stored in the data store 213. If a discrepancy exists between the actual weight of the storage unit 106 and an expected weight of the storage unit 106, the storage unit 106 may be automatically designated as defective. Thus, in response to measuring the weight of a storage unit 106, the storage unit data collector 219 may designate that storage unit 106 is defective if the measured weight substantially deviates from an expected weight.

In other embodiments, the storage unit data collector 219 automatically collects data from one or more storage units 106 using radio-frequency Identification (RFID) interrogation. For example, items and/or storage units 106 may each include a respective RFID tag used to track the item and/or storage unit 106. By performing an RFID scan, the contents for a particular storage unit 106 may be ascertained. Accordingly, the items that are actually stored in a particular storage unit 106 are determined. The storage unit data collector 219 may compare what is actually stored in the storage unit 106 to what is expected to be stored in that storage unit 106 to determine whether that storage unit 106 should be designated as defective.

Thus, the storage unit data collector 219 receives various inputs via the network 209 relating to information about each storage unit 106. The storage unit data may be stored as defect data 225, where the defect data 225 identifies those storage units 106 that have been designated as defective. A storage unit 106 may be designated as defective if there is a mismatch between the actual contents of the storage unit and the expected contents of the storage unit. Storage units 106 may be identified according to a storage unit identifier such as a storage unit number. The storage unit data may also be stored as location data 223, where the location data specifies a physical location for a particular storage unit 106.

The defect data 225 may include a listing of storage units 106 that have been designated as defective for a particular interval of time. It may be the case that collecting storage unit data for every storage unit 106 in the fulfillment center takes a significant amount of time that spans days to weeks. Accordingly, the defect data 225 may be systematically updated as groups of storage units 106 are sequentially tracked as part of the storage unit data collection process. Tracking may include counting and/or weighing items that are stored in a storage unit 106.

After defect data 225 is generated, the defect analyzer 216 analyzes the defect data 225 to generate a defect density map 105. By accessing the defect data 225, the defect analyzer 216 may identify which storage units 106 have been designated as defective. The defect analyzer 216 may determine the locations of the defective storage units by accessing the location data 223. The defect analyzer 216 may determine concentrations of storage unit defects by mapping the location of defective storage units to various sectors 109 that have been defined according to sector data 231. The defect analyzer 216 may generate a defect density map 105 by overlaying the concentration of storage unit defects using a physical layout map 228 of the fulfillment center 102. The defect analyzer 216 may encode the defect density map 105 for display in the user interface 103. For example, the defect analyzer 216 may generate a document such as, for example, an HTML document that includes the defect density map 105.

Figures 3A, 3B:
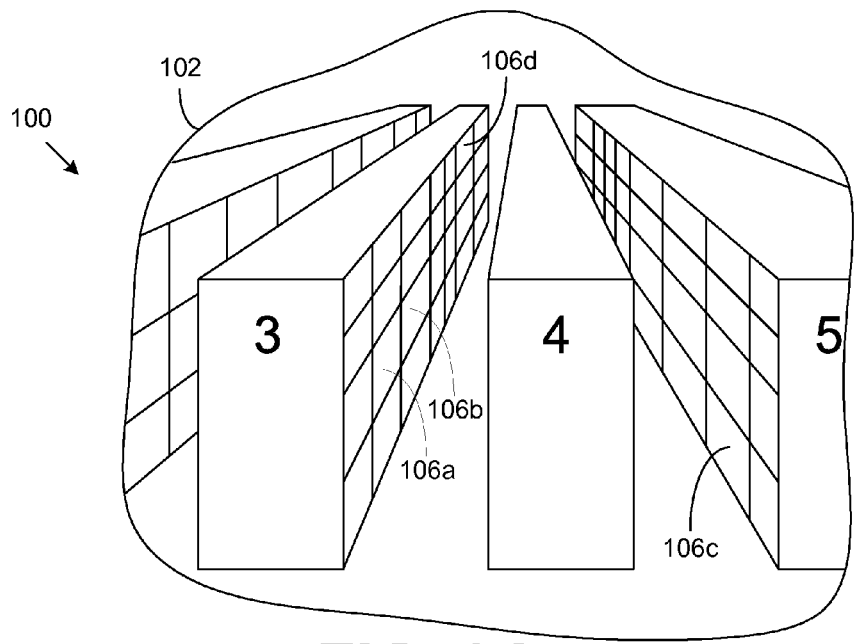
FIG. 3A is a drawing of a physical representation of a fulfillment center in the networked environment of FIG. 1.
FIG. 3B is a drawing of a virtual representation of a fulfillment center in the networked environment of FIG. 1.

Referring next to FIG. 3A, shown is a drawing of a physical representation of a fulfillment center 102 in the networked environment 100 of FIG. 1. The fulfillment center 102 may include a multitude of storage units 106 that are organized in rows, columns, shelves, aisles, or any combination thereof. For example, row number three of the fulfillment center 102 may include some storage units 106a, b,d, while row number five may include other storage units 106c. Each storage unit 106 may be empty such that the storage unit 106 does not include any items, or the storage unit 106 may include one or more items. As the various storage units 106 are utilized in the fulfillment center 102, it may be the case that an item that is designated to be stored in one storage unit 106 is accidentally or erroneously placed in another storage unit 106. As a result, a storage unit defect occurs when a storage unit 106 stores an item that is not designated for that storage unit 106 or when the storage unit does not store an item that is designated for that storage unit 106.

In the example of FIG. 3A, the item "Alligator Cufflinks" is stored in the first storage unit 106a, the item "Emo hair wig" is stored in the second storage unit 106b, the third storage unit 106c is empty such that no items are stored in the third storage unit 106c, and the items of a "vacuum cleaner" and a "Trojan horse toy" are stored in the fourth storage unit 106d.

Turning now to FIG. 3B, shown is a drawing of a virtual representation of a fulfillment center 102 (FIG. 1) in the networked environment of FIG. 1. The virtual representation of the fulfillment center 102 corresponds to the physical fulfillment center 102 expressed in the form of a table. In this respect, the virtual representation expresses the status of the physical fulfillment center using various data structures that track the contents and organization of the physical fulfillment center 102. Thus, while the physical fulfillment center 102 represents the actual fulfillment center 102 in reality, the virtual representation of the fulfillment center 102 represents an expected view of the actual fulfillment center 102. The virtual representation of the fulfillment center 102 may be continuously updated as items are physically placed in and/or removed from various storage units 106.

For example, the virtual representation of the fulfillment center 102 may specify information about each storage unit 106 using data structures. A first storage unit 106a may physically exist in the fulfillment center 102 as depicted in FIG. 3A. A virtual representation of the first storage unit 106a is depicted in FIG. 3B. The virtual representation may specify a storage unit number, location, listing of items, weight, and defect status for each storage unit 106. For the first storage unit 106a, the storage unit number is "30309" and the location is "row 3, shelf 78." Furthermore, the first storage unit 106a includes the item "alligator cufflinks" and the contents of the first storage unit weigh 1.2 lbs. Because the virtual representation of the first storage unit 106a accurately represents the contents and/or weight of the first storage unit 106a, the first storage unit 106a is not designated as defective.

The virtual representation of the second storage unit 106b specifies that the second storage unit 106b includes the items of a "beach towel" and an "Emo hair wig." Because the second storage unit 106b does not actually store a beach towel, as discussed with respect to FIG. 3A, the second storage unit 106b is designated as defective. In this respect, a storage unit defect occurs when there is a discrepancy between what is actually stored in a storage unit 106b and what is virtually represented as being stored in that storage unit 106b.

A storage unit data collector 219 (FIG. 2) may manage storing portions of the virtual representation of the fulfillment center 102. As shown in FIG. 3B, portions of the virtual representation of the fulfillment center 102 may specify which storage units 106 are designated as defective. This information may be stored as defect data 225. For example, the virtual representation of the fulfillment center 102 may be verified by comparing the virtual representation of the fulfillment center 102 to the actual fulfillment center 102. Individuals may check the actual storage units 106 to verify whether the virtual representation of the fulfillment center is accurate. If there is a mismatch between the virtual representation of the fulfillment center 102 and the physical fulfillment center 102, then a storage unit 106 associated with the mismatch is designated as defective.

Additionally, the location of these defective storage units and/or non-defective storage units may be stored as location data 223. As the virtual representation of the fulfillment center 102 is updated, the storage unit data collector 219 may extract the defect data 225 and/or the location data 223.

The non-limiting example of FIG. 3B depicts defect data 225 that is expressed as a binary representation of whether a particular storage unit of the plurality of storage units is defective. However, various embodiments are not so limited. For example, the defect data 225 may express a severity of a defect within the particular storage unit 106. In this case, a particular storage unit may have an expected weight and an actual weight. The degree of discrepancy between the expected weight and the actual weight may be represented as a degree of severity of the storage unit defect. Using the example of FIG. 3B, the virtual representation of the second storage unit 106b specifies that the second storage unit 106b contains two items (i.e., beach towel, Emo hair wig) while the second storage unit 106b physically contains a single item (i.e., Emo hair wig). The severity of this discrepancy may be quantified in terms of the number of items relating to this discrepancy (i.e., in this case one additional item) or in terms of a difference in weight relating to this discrepancy (i.e., in this case the weight of the additional item(s)). The actual weight of the second storage unit 106b would be less than the expected weight of the second storage unit 106b because the virtual representation of the second storage unit 106b specifies that the second storage unit 106b erroneously contains the additional item of a beach towel.

In addition, FIG. 3B depicts a representation of employee data 234. The employee data 234 may reflect a record of an event that associates an individual to an action taken with respect to a particular storage unit 106. An action may involve placing an item, picking an item, counting an item, tracking an item, or any other interaction with respect to a storage unit 106. The employee data 234 may comprise names and/or identifiers for each individual working in the fulfillment center 102. Furthermore, the employee data 234 may associate a particular individual to a storage unit 106 or a range of storage units 106. This association between an individual and a storage unit 106 may be determined in response to the individual interacting with the storage unit 106. For example, if the employee "Bob" places, picks, tracks/counts the item of "Alligator Cufflinks" with respect to the first storage unit 106a, Bob may scan a barcode of the item and a barcode of the first storage unit 106a to record the interaction. Accordingly, the employee data 234 may be updated to reflect this interaction.

Figure 4:
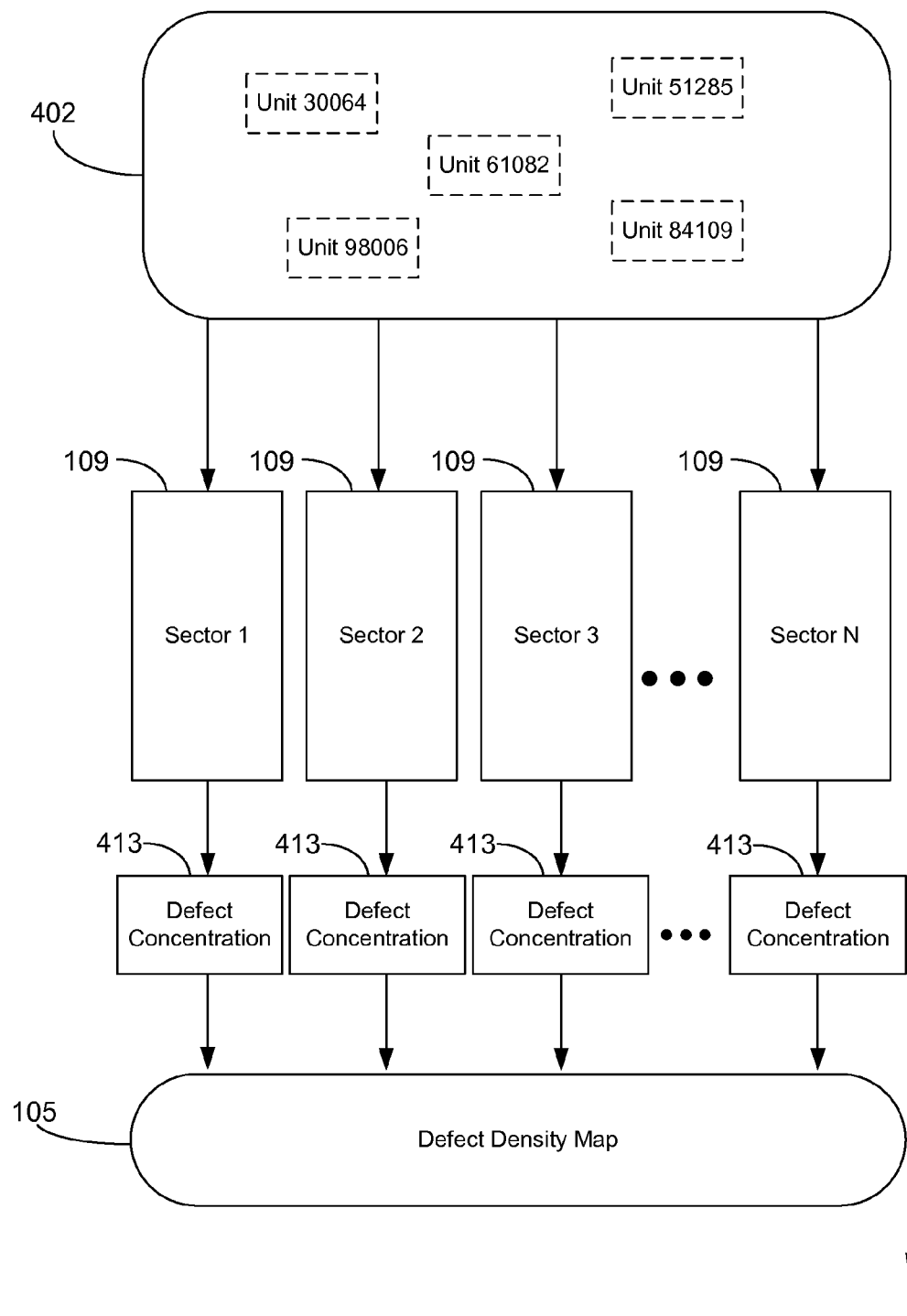
FIG. 4 is a drawing of an example of functionality implemented as portions of a defect analyzer executed in the networked environment of FIG. 1.

Moving on to FIG. 4, shown is a drawing of an example of functionality implemented as portions of the defect analyzer 216 executed in the networked environment 100 of FIG. 1. The defect analyzer 216 may identify a subset of defective storage units 402 among the various storage units 106 (FIG. 1) of a fulfillment center 102 (FIG. 1). In addition, the defect analyzer 216 may identify each location associated with each of the defective storage units 402. In this respect, the defect analyzer 216 may identify a row, column, shelf, and/or aisle for each of the defective storage units 402.

The defect analyzer 216 may access sector data 231 (FIG. 2) to determine a manner of allocating each defective storage unit 402 to a respective sector 109. The sector data 231 may specify multiple sectors 109 as well as the boundaries for each of the sectors 109. The boundaries for each sector may be specified as a range of rows, columns, shelves, and/or aisles.

The defect analyzer 216 uses the location of an identified defective storage unit 402 to select an appropriate sector 109 according to the boundaries of that sector 109. Thus, for each sector 109, the defect analyzer 216 may determine the number of storage units 106 and the number of defective storage units 402. Based at least in part upon the number of defective storage units 402 in a sector 109, the defect analyzer 216 may determine a defect concentration 413 for that sector 109. For example, the defect analyzer 216 may determine the defect concentration 413 according to the number of defective storage units 402 in a sector 109 and the total number of storage units 106 in that sector 109. The defect concentration 413 for a particular sector 109 may be quantified in terms of an overall number of defective storage units 402, the percentage of storage units that are defective, the number of storage units that are not defective, the percentage of storage units that are not defective, or any combination thereof. Additionally, if the storage unit defect data expresses the severity of the storage unit defect, then the defect concentration 413 may be based at least in part on the storage unit defect severity.

The defect analyzer 216 may generate a defect density map 105 based on the defect concentration 413, the sector data 231, and the physical layout map 228 (FIG. 2). The defect analyzer 216 may assign each sector 109 a color value, a gray scale value, and/or a fill pattern according to the defect concentration 413 for that sector 109. In this respect, each sector 109 may be associated with a corresponding visual indicator that expresses a quantification of the defect concentration 413. The defect analyzer 216 may overlay the visual indicators using the physical layout map 228 to generate a defect density map 105.

Figure 5A:
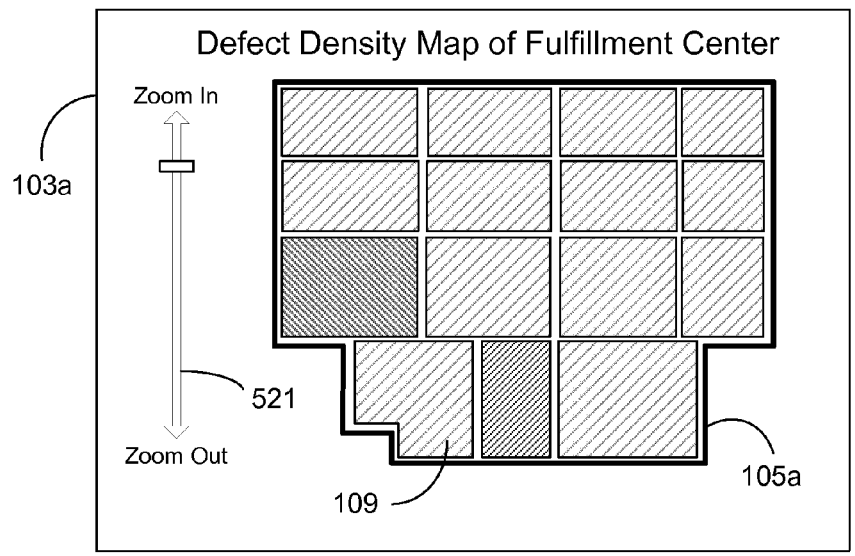
FIG. 5A is a drawing of an example of a user interface rendered by a client in the networked environment of FIG. 1, according to various embodiments of the present disclosure.

Referring next to FIG. 5A, shown is a drawing of an example of a user interface 103a rendered by a client device 206 (FIG. 2) in the networked environment 100 of FIG. 1, according to various embodiments of the present disclosure. The user interface 103a presents a defect density map 105a that includes multiple sectors 109. As shown in FIG. 5A, each sector may be represented as a visual indicator that corresponds to a defect concentration 413 (FIG. 4). The orientation of each of the sectors 109 may be stored as sector data 231 (FIG. 2). The sector data 231 indicates the number of sectors, the size of the sectors, the shape of the sectors, and/or any other information relating to the layout of the sectors.

The user interface 103a may be operable to receive user input 521 that specifies the degree of granularity of the sector size. For example, the user interface 103a may include a form object, a user interface tool, one or more buttons, a slider, or any other object to receive a user input 521. The user input 521 may ultimately control the number of sectors 109 and/or the average size of the sectors 109 to achieve a desired granularity. According to various embodiments, a user may submit a user input 521 to control the boundaries of one or more sectors 109. In this respect, the degree of granularity of the sector size is based at least in part upon the number of sectors, the orientation of the sectors, or any combination thereof.

In response to receiving the user input 521, the defect analyzer 216 (FIG. 2) may update the sector data 231 to reflect the desired degree of granularity of sector size. In the non-limiting example of FIG. 5A the user desires a relatively low degree of granularity to achieve a zoomed in view. Accordingly, the defect analyzer 216 may update the sector data 231 to specify sectors 109 that are defined by a relatively low degree of granularity. The defect analyzer 216 may define the boundaries of the sectors 109 such that a relatively large number of sectors are used to partition the physical layout map 228 (FIG. 2) of the fulfillment center 102 (FIG. 1).

Figure 5B:
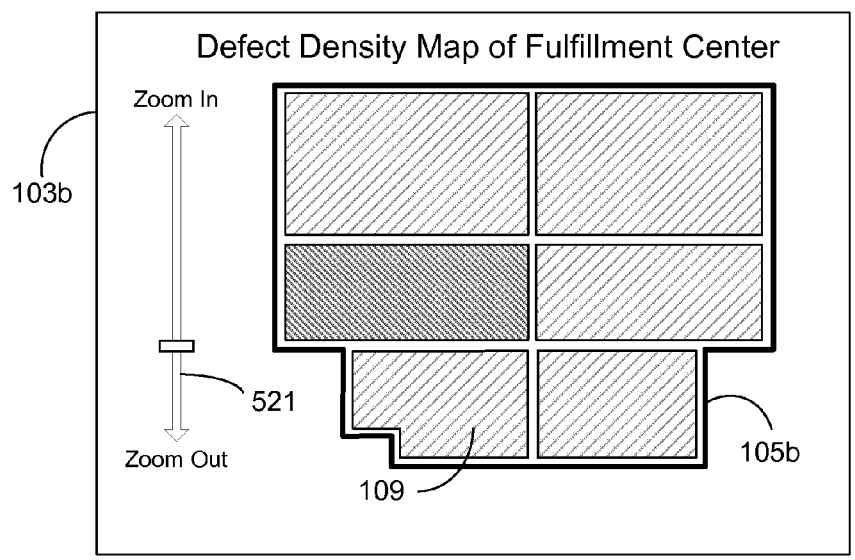
FIG. 5B is a drawing of a user interface rendered by a client in the networked environment of FIG. 1, according to various embodiments of the present disclosure.

Referring next to FIG. 5B, shown is a drawing of an example of a user interface 103b rendered by a client device 206 (FIG. 2) in the networked environment 100 of FIG. 1, according to various embodiments of the present disclosure. The user interface 103b presents a defect density map 105b that is based on the same defect data 225 (FIG. 2) used to generate the defect density map 105a of FIG. 5A. However, the defect density map 105b of FIG. 5B is generated according to sector data 231 (FIG. 2) that is different than the sector data of FIG. 5A. According to the user input 521 of FIG. 5B, the user desires a relatively high degree of granularity. Thus, using the user input 521, the defect analyzer 216 may define the boundaries of the sectors 109 such that a relatively small number of sectors are used to partition the physical layout map 228 (FIG. 2) of the fulfillment center 102 (FIG. 1).

By submitting a user input 521, the user may adjust the orientation, size, and/or quantity of the sectors 109. The defect analyzer 216 may store the user's preferences as sector data 231 to generate sectors 109 according to the user input 521.

Figure 6:
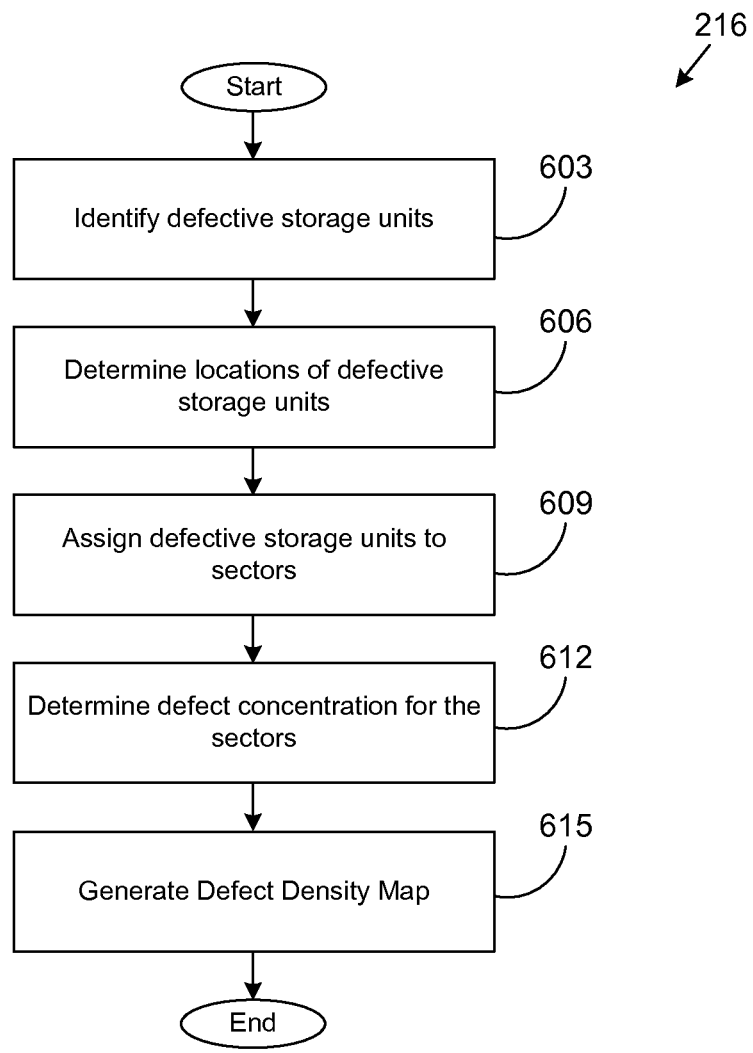
FIG. 6 is a flowchart illustrating one example of functionality implemented as portions of the defect analyzer executed in a computing environment in the networked environment of FIG. 1, according to various embodiments of the present disclosure.

Referring next to FIG. 6, shown is a flowchart that provides one example of the operation of a portion of the defect analyzer 216 (FIG. 2) according to various embodiments. It is understood that the flowchart of FIG. 6 provides merely an example of the many different types of functional arrangements that may be employed to implement the operation of the portion of the defect analyzer 216 as described herein. As an alternative, the flowchart of FIG. 6 may be viewed as depicting an example of steps of a method implemented in the computing environment 203 (FIG. 2) according to one or more embodiments.

Beginning at 603, the defect analyzer 216 identifies defective storage units 402 (FIG. 4). The defective storage units 402 may be a subset of the total number of storage units 106 (FIG. 1) located in a fulfillment center 102 (FIG. 1). The defect analyzer 216 may access the defect data 225 (FIG. 2) that is stored in a data store 213 (FIG. 2) to identify the defective storage units 402. The defect data 225 may be collected, tracked, and/or stored by the storage unit data collector 219 (FIG. 2). The storage unit data collector 219 extracts defect data 225 from data reflecting a virtual representation of the fulfillment center 102. For example, the storage unit data collector 219 may compare an expected storage unit value to an actual storage unit value to determine whether the storage unit 106 is defective. If there is a mismatch between the expected storage unit value and the actual storage unit value, then that storage unit 106 is designated as defective. If the storage unit is designated as defective, the defect data 225 is updated. In this example, the expected storage unit value may be an expected quantity of items or an expected storage unit weight, and the actual storage unit value may be an actual quantity of items for an actual storage unit weight.

Additionally, the storage unit data collector 219 may receive manual entries of storage unit information that specify whether a particular storage unit 106 is designated as defective. For example, an individual working in the fulfillment center 102 may use an input device (e.g., a keyboard, a mouse, a scanner, etc.) to specify whether a particular storage unit is designated as defective. Thus, the defect analyzer 216 accesses the defect data 225 that is extracted by the storage unit data collector 219 to identify which storage units are designated as defective.

At 606, the defect analyzer 216 determines the locations of the defective storage units 402. The defect analyzer 216 may access location data 223 (FIG. 2) that is stored in a data store 213. The location data 223 indicates a physical location for each of the defective storage units 402. The location data 223 may be expressed in terms of a row, column, shelf, and/or aisle. The storage unit data collector 219 may identify the location of each of the defective storage units 402 according to data reflecting the virtual representation of the fulfillment center 102.

At 609, the defect analyzer 216 assigns the defective storage units 402 to various sectors 109. The defect analyzer 216 may access sector data 231 (FIG. 2) that is stored in the data store 213. The sector data 231 may specify an arrangement of various sectors 109 in the fulfillment center 102. For example, the sector data 231 the boundaries of each of the sectors 109 (FIG. 1) such that the boundaries are defined in terms of a range of rows, a range of aisles, a range of shelves, and/or a range of columns. According to the orientation of the sectors 109, the defect analyzer 216 associates each defective storage unit 402 to with a corresponding sector 109 based on the location of the defective storage unit 402 and the boundaries and location of the corresponding sector 109.

At 612, the defect analyzer 216 determines a defect concentration 413 (FIG. 4) for the sectors 109. Each sector 109 may be associated with a defect concentration 413 that varies from one sector 109 to another sector 109. The defect concentration 413 may represent a total number of defective storage units 402 for a particular sector 109 or a percentage of defective storage units 402 for that particular sector 109. In various embodiments, the defect concentration 413 may be based at least in part upon the severity of the storage unit defects in the case where the defect data 225 represents the severity of a storage unit defect for particular storage unit 106.

For a particular sector 109, the defect analyzer 216 may generate a visual indicator for the particular sector 109 according to the defect concentration 413 for the particular sector 109. The visual indicator may correlate to a quantification of the defect concentration 413 for the particular sector 109. The visual indicator for a particular sector 109 may have a shape that represents the boundaries of the sector.

The defect analyzer 216 may convert or otherwise translate the degree of the defect concentration 413 to a visual indicator by assigning the visual indicator that a particular color value, grayscale value, and/or fill pattern that represents the degree of the defect concentration. For example, a sector 109 that has a high defect concentration 413 may be associated with a visual indicator having a particular color, saturation value, fill pattern, or transparency value. As a non-limiting example, high defect concentrations 413 may have a darker color and/or opaque fill pattern while low defect concentrations 413 may have a lighter color and/or transparent fill pattern.

At 615, the defect analyzer 216 generates a defect density map 105 (FIG. 1). The defect density map 105 overlays the visual indicators using the physical layout map 228 (FIG. 2) of the fulfillment center 102. Thus, the defect density map 105 may be a heat map that identifies "hotspots" of high concentrations of defective storage units 402 with respect to the physical layout of the fulfillment center 102. The defect analyzer 216 encodes the defect density map 105 for rendering the defect density map 105 in a display 243 (FIG. 2) of a client device 206 (FIG. 2).

The defect density map 105 may be generated according to defect data 225 that has been collected for a particular interval of time. It may be the case that the defect density map 105 is generated according to defect data 225 that represents data collection that spans multiple intervals of time related to multiple instances of data collection. As defect data 225 of a portion of the fulfillment center is obtained, the defect density map 105 may be updated according to the updated defect data 225 for that portion. In other embodiments, the defect data 225 may be continuously updated as storage units 106 are counted and/or tracked as part of the data collection process. The defect density map 105 may be dynamically updated in real time as the defect data 225 is updated. For example, as an individual counts each storage unit 106, the storage unit data collector 219 tracks whether the storage unit 106 is defective to generate defect data 225 in real time. The defect analyzer may update the defect density map in real time upon each update of the defect data 225.

According to various embodiments, the defect analyzer 216 may automatically generate a notification in response to a defect concentration 413 exceeding a predetermined threshold concentration. For example, if the defect concentration 413 for a sector 109 exceeds a threshold amount, a notification may be generated and transmitted to a predetermined source such as, for example, a client device 206. In other embodiments, the defect analyzer 216 may generate a subsequent notification when the defect concentration 413 for a sector 109 returns to an acceptable defect concentration 413. The subsequent notification may reflect that remedial action to reduce a defect concentration 413 is relatively successful. In this respect, the defect analyzer 216 automatically generates a subsequent notification in response to the defect concentration 413 of a sector 109 exceeding a first predetermined threshold amount and then falling below a second predetermined threshold amount. The first predetermined threshold amount and the second predetermined threshold amount may or may not be the same value.

The notification may be an electronic communication such as, for example, an e-mail, an instant message, a Short Message Service (SMS) text message, a phone call, a voicemail, or any other electronic communication. Additionally, the notification may be an alarm such as an audio or visual alarm.

Figure 7:
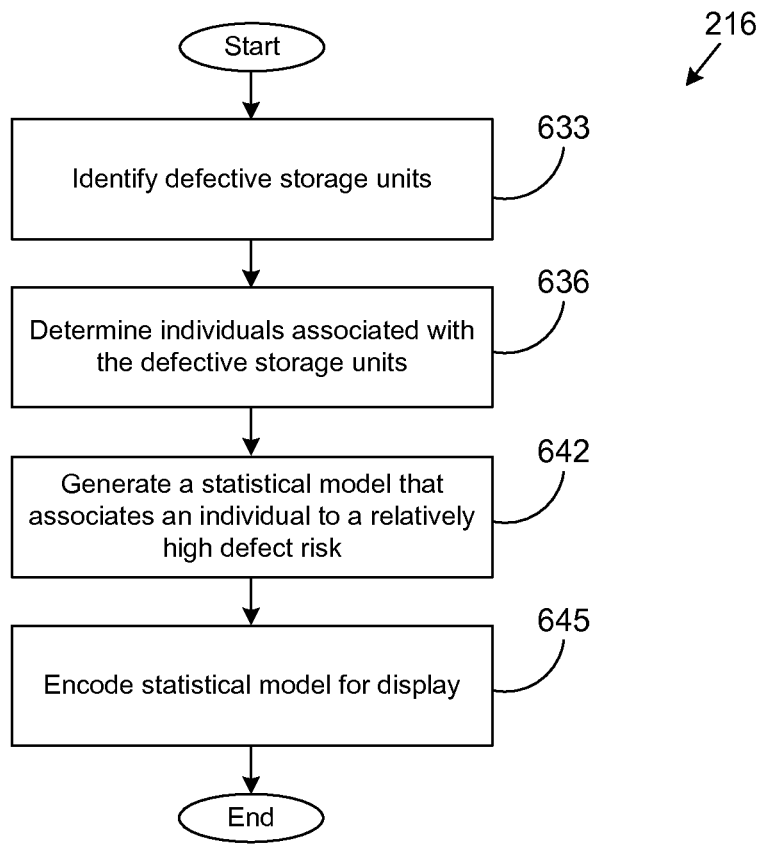
FIG. 7 is a flowchart illustrating one example of functionality implemented as other portions of the defect analyzer executed in a computing environment in the networked environment of FIG. 1, according to various embodiments of the present disclosure.

Referring next to FIG. 7, shown is a flowchart that provides one example of the operation of another portion of the defect analyzer 216 (FIG. 2) according to various embodiments. It is understood that the flowchart of FIG. 7 provides merely an example of the many different types of functional arrangements that may be employed to implement the operation of the portion of the defect analyzer 216 as described herein. As an alternative, the flowchart of FIG. 7 may be viewed as depicting an example of steps of a method implemented in the computing environment 203 (FIG. 2) according to one or more embodiments.

Beginning at 633, the defect analyzer 216 identifies defective storage units 402 (FIG. 4). The defective storage units 402 may be a subset of the total number of storage units 106 (FIG. 1) located in a fulfillment center 102 (FIG. 1). The defect analyzer 216 may access the defect data 225 (FIG. 2) that is stored in a data store 213 (FIG. 2) to identify the defective storage units 402. The defect data 225 may be collected, tracked, and/or stored by the storage unit data collector 219 (FIG. 2). The storage unit data collector 219 extracts defect data 225 from data reflecting a virtual representation of the fulfillment center 102. For example, the storage unit data collector 219 may compare an expected storage unit value to an actual storage unit value to determine whether the storage unit 106 is defective. If there is a mismatch between the expected storage unit value and the actual storage unit value, then that storage unit 106 is designated as defective. If the storage unit is designated as defective, the defect data 225 is updated. In this example, the expected storage unit value may be an expected quantity of items or an expected storage unit weight, and the actual storage unit value may be an actual quantity of items for an actual storage unit weight.

At 636, the defect analyzer 216 determines one or more individuals associated with the defective storage units. The defect analyzer 216 may use employee data 234 (FIG. 2) to determine which individuals have an association with the defective storage units 402. For example, a record may be generated in response to an individual scanning an item and/or storage unit 106 when that user places, removes, or counts the item with respect to the storage unit 106. The record indicates that the individual has a level of responsibility with respect to the storage unit 106. The record may comprise the individual's name, employee number, or any other identifier of the individual. The individual may be linked to a particular scanning device 245 (FIG. 2) or client device 206 (FIG. 2) such that use of the scanning device 245 or client device 206 causes an association between that individual and that use. Thus, the employee data 234 may include a listing of records relating to individuals interacting with storage units 106.

At 642, the defect analyzer 216 generates a statistical model that associates an individual to a relatively high defect concentration 413. The statistical model may comprise a bar graph, pie chart, histogram, or any other model that identifies which individuals are associated with a relatively high defect risk. An individual associated with a relatively high defect risk may be reflected as an outlier in the statistical model. In the non-limiting example of FIG. 3B, the employee named "Arvind" is associated with the defect of the second storage unit 106b (FIG. 3B). Thus, a particular employee himself or herself may be associated with causing a storage unit defect. This individual may be a cause of a high risk of defect among the storage units 106.

At 645, the defect analyze encodes the statistical model for display. For example, the defect analyzer 216 may generate a document such as, for example, an HTML document that includes the statistical model. Thus, a fulfillment center manager may identify one or more individuals associated with a relatively large number of defective storage units 402 in order to take remedial or preventative actions.

Figure 8:
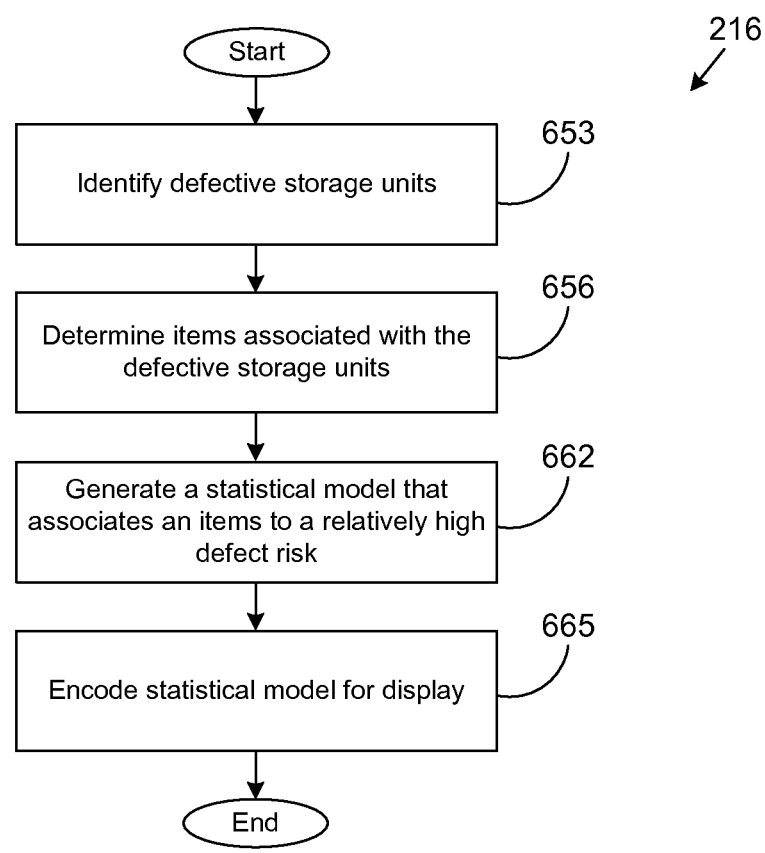
FIG. 8 is a flowchart illustrating one example of functionality implemented as other portions of the defect analyzer executed in a computing environment in the networked environment of FIG. 1, according to various embodiments of the present disclosure.

Referring next to FIG. 8, shown is a flowchart that provides one example of the operation of another portion of the defect analyzer 216 (FIG. 2) according to various embodiments. It is understood that the flowchart of FIG. 8 provides merely an example of the many different types of functional arrangements that may be employed to implement the operation of the portion of the defect analyzer 216 as described herein. As an alternative, the flowchart of FIG. 8 may be viewed as depicting an example of steps of a method implemented in the computing environment 203 (FIG. 2) according to one or more embodiments.

Beginning at 653, the defect analyzer 216 identifies defective storage units 402 (FIG. 4). The defective storage units 402 may be a subset of the total number of storage units 106 (FIG. 1) located in a fulfillment center 102 (FIG. 1). The defect analyzer 216 may access the defect data 225 (FIG. 2) that is stored in a data store 213 (FIG. 2) to identify the defective storage units 402. The defect data 225 may be collected, tracked, and/or stored by the storage unit data collector 219 (FIG. 2). The storage unit data collector 219 extracts defect data 225 from data reflecting a virtual representation of the fulfillment center 102. For example, the storage unit data collector 219 may compare an expected storage unit value to an actual storage unit value to determine whether the storage unit 106 is defective. If there is a mismatch between the expected storage unit value and the actual storage unit value, then that storage unit 106 is designated as defective. If the storage unit is designated as defective, the defect data 225 is updated. In this example, the expected storage unit value may be an expected quantity of items or an expected storage unit weight, and the actual storage unit value may be an actual quantity of items for an actual storage unit weight.

At 656, the defect analyzer 216 determines one or more items associated with the defective storage units. The defect analyzer 216 may use item data 237 (FIG. 2) to determine which individuals have an association with the defective storage units 402. For example, the item data 237 may indicate each instance where an item is stored in a defective storage unit 402 (FIG. 4). Moreover, the item data 237 may specify how many times each item has been associated with a defective storage unit 402. For example, if an item is erroneously stored in a storage unit 106 or is erroneously omitted from a storage unit 106, then the item data 237 may reflect either of these events. Also, the item data 237 may indicate whether an item is erroneously counted.

At 662, the defect analyzer 216 generates a statistical model that associates an item to a relatively high defect concentration. The statistical model may comprise a bar graph, pie chart, histogram, or any other model that identifies which items are associated with a relatively high defect risk. An item associated with a relatively high defect risk may be reflected as an outlier in the statistical model. In the non-limiting example of FIG. 3B, the item "Beach Towel" is associated with the defect of the second storage unit 106b (FIG. 3B). Thus, the Beach Towel item itself may be associated with causing a storage unit defect. This item may be a cause of a high risk of defect among the storage units 106.

At 665, the defect analyze encodes the statistical model for display. For example, the defect analyzer 216 may generate a document such as, for example, an HTML document that includes the statistical model. Thus, a fulfillment center manager may identify one or more individuals associated with a relatively large number of defective storage units 402 in order to take remedial or preventative actions.

Figure 9:
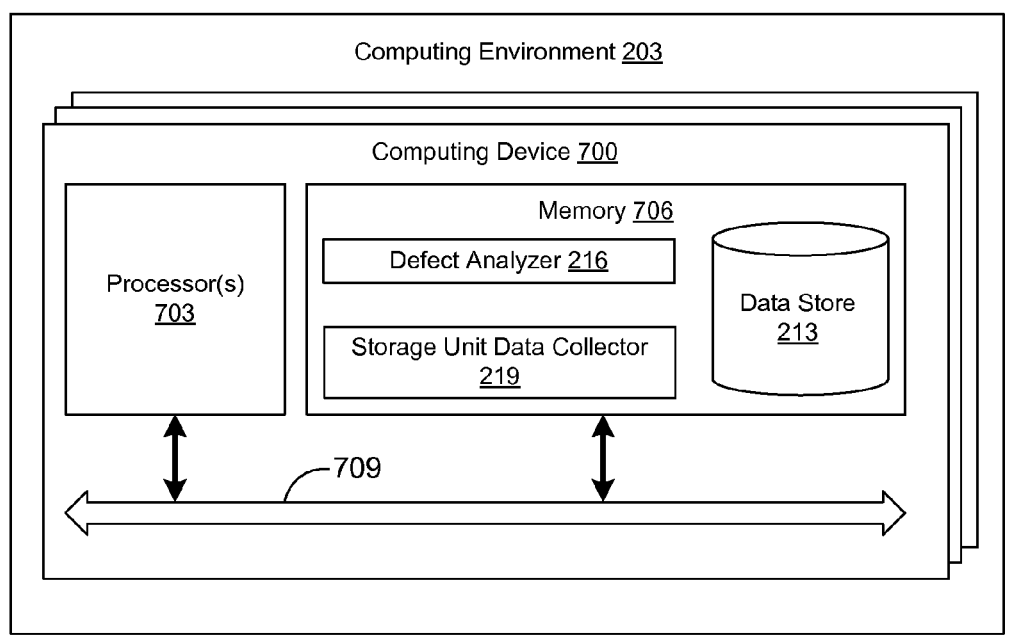
FIG. 9 is a schematic block diagram that provides one example illustration of a computing environment employed in the networked environment of FIG. 1 according to various embodiments of the present disclosure.

With reference to FIG. 9, shown is a schematic block diagram of the computing environment 203 (FIG. 2) according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are a defect analyzer 216, a storage unit data collector 219, and potentially other applications. Also stored in the memory 706 may be a data store 213 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the defect analyzer 216, the storage unit data collector 219, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6-8 show the functionality and operation of an implementation of portions of the defect analyzer 216. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 6-8 show a specific order of execution, it is understood that the order of execution may differ from that which is depicted. For example, the order of execution of two or more blocks may be scrambled relative to the order shown. Also, two or more blocks shown in succession in FIGS. 6-8 may be executed concurrently or with partial concurrence. Further, in some embodiments, one or more of the blocks shown in FIGS. 6-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the defect analyzer 216 and the storage unit data collector 219, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable in at least one computing device wherein, when executed, the plurality of computer instructions cause the at least one computing device to:
   identify, in response to accessing defect data by performing a radio-frequency Identification (RFID) scan of storage unit content, a subset of defective storage units among a plurality of storage units within a fulfillment center, the subset of defective storage units being designated as defective within an interval of time, wherein a respective storage unit is designated as defective based at least in part on a determined mismatch between an actual storage unit content for the respective storage unit and a virtual representation of an expected storage unit content for the respective storage unit;
   determine a plurality of physical locations associated with the subset of defective storage units by accessing location data;
   associate individual ones of the physical locations with a respective sector among a plurality of sectors of the fulfillment center;
   determine a concentration of the subset of defective storage units for each of the plurality of sectors, the concentration being a percentage of a number of the subset of defective storage units in the sector out of an overall number of the storage units in the sector, the overall number including the subset of defective storage units as well as storage units that are not defective;

generate a defect density map according to the plurality of sectors, the defect density map expressing the concentration of the subset of defective storage units within each of the plurality of sectors and depicting an orientation of each of the plurality of sectors in a physical layout map of the fulfillment center; and encode the defect density map for display in a user interface.

2. The non-transitory computer-readable medium of claim 1, wherein the individual ones of the physical locations are associated with the respective sector based at least in part on a user input, the user input specifying a degree of granularity of a sector size, the degree of granularity corresponding to a number of sectors that are used to partition the physical layout map.

3. The non-transitory computer-readable medium of claim 1, wherein the plurality of computer instructions further cause the at least one computing device to automatically generate a notification in response to a determination that the concentration of the subset of defective storage units exceeds a threshold concentration.

4. The non-transitory computer-readable medium of claim 1, wherein the plurality of computer instructions further cause the at least one computing device to translate the concentration for individual ones of the sectors to a respective visual indicator, each respective visual indicator comprising at least one of a color value, a gray scale value, or a fill pattern.

5. A system, comprising:
   at least one computing device; and
   an application executable in the at least one computing device, the application causing the at least one computing device to:
   identify, in response to accessing defect data, a subset of defective storage units among a plurality of storage units, wherein a respective storage unit is considered a defective storage unit based at least in part on a determined mismatch between an actual storage unit content for the respective storage unit and a virtual representation of an expected storage unit content for the respective storage unit;
   determine a plurality of physical locations associated with the subset of defective storage units;
   assign the defective storage units among the subset of defective storage units to corresponding sectors among a plurality of sectors of a fulfillment center; and
   generate a heat map expressing a concentration of the subset of defective storage units within each of the corresponding sectors based at least in part on a percentage of a number of the subset of defective storage units assigned to each of the corresponding sectors out of an overall number of the storage units in each of the corresponding sectors that includes the subset of defective storage units as well as storage units that are not defective and depicting an orientation of each of the plurality of sectors in a physical layout map of the fulfillment center.

6. The system of claim 5, wherein the application further causes the at least one computing device to update the heat map in response to the defect data being updated.

7. The system of claim 5, wherein the concentration of the subset of defective storage units comprises a first concentration associated with a first sector among the plurality of sectors and a second concentration associated with a second sector among the plurality of sectors.

8. The system of claim 5, wherein the application further causes the at least one computing device to determine a plurality of color values to represent the concentration of the subset of defective storage units.

9. The system of claim 5, wherein the application further causes the at least one computing device to automatically generate a notification in response to the concentration of the subset of defective storage units exceeding a threshold concentration, the notification comprising at least one of an electronic communication or an alarm.

10. The system of claim 9, wherein the application further causes the at least one computing device to automatically generate a subsequent notification in response to the concentration of the subset of defective storage units falling below a second threshold concentration.

11. The system of claim 5, wherein the application further causes the at least one computing device to determine the plurality of physical locations by accessing location data, the location data specifying the plurality of physical locations in terms of at least one of a row number, an aisle number, or a shelf number.

12. The system of claim 5, wherein the application further causes the at least one computing device to:
   determine a plurality of items associated with the subset of defective storage units; and
   generate a statistical model that indicates that at least one of the items among the plurality of items is associated with a relatively high defect risk with respect to other items among the plurality of items.

13. A method, comprising: identifying, by a computing device, a subset of defective storage units among a plurality of storage units, wherein a respective storage unit is considered a defective storage unit based at least in part on a determined mismatch between an actual storage unit content for the respective storage unit and a virtual representation of an expected storage unit content for the respective storage unit, the determined mismatch being based at least in part upon defect data;
   accessing, by the computing device, location data indicating a plurality of physical locations associated with the subset of defective storage units;
   determine a concentration of the subset of defective storage units based at least in part on a percentage of a number of the subset of defective storage units in each of a plurality of sectors of a fulfillment center out of an overall number of the storage units in each of the plurality of sectors that includes the subset of defective storage units as well as storage units that are not defective;
   generating, by the computing device, a defect density map according to the plurality of physical locations, the defect density map expressing the concentration of the subset of defective storage units within the fulfillment center and depicting a location of each of the plurality of sectors in a physical layout map of the fulfillment center; and
   encoding the defect density map for display in a user interface.

14. The method of claim 13, further comprising mapping the concentration of the subset of defective storage units to the plurality of sectors within the fulfillment center, wherein individual ones of the sectors are defined according to at least one of a range of rows, a range of columns, a range of aisles, or a range of shelves.

15. The method of claim 13, further comprising automatically generating a notification in response to the concentration of the subset of defective storage units exceeding a predetermined threshold concentration.

16. The method of claim 13, wherein the defect data represents that the subset of defective storage units is designated as defective within an interval of time, wherein the defect density map expresses the concentration of the subset of defective storage units for the interval of time.

17. The method of claim 13, wherein the defect data comprises a binary representation of whether a particular storage unit of the plurality of storage units is defective.

18. The method of claim 13, further comprising:
   for each of the plurality of storage units, comparing an expected storage unit value to an actual storage unit value;
   designating a storage unit as defective in response to a mismatch between the expected storage unit value and the actual storage unit value; and
   updating the defect data according to the mismatch.

19. The method of claim 18, wherein the expected storage unit value comprises at least one of an expected quantity of items or an expected storage unit weight, wherein the actual storage unit value comprises at least one of an actual quantity of items or an actual storage unit weight.

20. The method of claim 13, wherein the location data specifies the plurality of physical locations in terms of at least one of a row number, an aisle number, or a shelf number.

21. The method of claim 13, further comprising converting a degree of the concentration of the subset of defective storage units to a visual indicator, the visual indicator comprising at least one of a color value, a gray scale value, or a fill pattern.

22. The method of claim 13, further comprising:
   determining a plurality of individuals associated with the subset of defective storage units; and
   generating a statistical model that indicates that at least one of the individuals among the plurality of individuals is associated with a relatively high defect risk with respect to other individuals among the plurality of individuals.

23. The method of claim 22, further comprising generating a document that includes the statistical model.

* * * * *